(12) United States Patent
Greenfield et al.

(10) Patent No.: US 10,114,382 B2
(45) Date of Patent: Oct. 30, 2018

(54) FLEXIBLE COMMAND MODEL FOR AIRCRAFT CONTROL

(71) Applicant: Sikorsky Aircraft Corporation, Stratford, CT (US)

(72) Inventors: Aaron L. Greenfield, Shelton, CT (US); Kenneth S. Wittmer, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/423,121

(22) Filed: Feb. 2, 2017

(65) Prior Publication Data
US 2017/0329349 A1 Nov. 16, 2017

Related U.S. Application Data (60) Provisional application No. 62/334,206, filed on May 10, 2016.

(51) Int. Cl.
| | | |
|---|---|---|
| *G05D 1/08* | (2006.01) | |
| *B64C 13/04* | (2006.01) | |
| *G05D 1/00* | (2006.01) | |
| *B64C 13/50* | (2006.01) | |

(52) U.S. Cl.
CPC .............. *G05D 1/085* (2013.01); *B64C 13/04* (2013.01); *B64C 13/503* (2013.01)

(58) Field of Classification Search
CPC ........ G05D 1/085; B64C 13/04; B64C 13/503
USPC ............................................. 701/3, 4, 8, 13
See application file for complete search history.

(56) References Cited

U.S. PATENT DOCUMENTS

| | | | |
|---|---|---|---|
| 5,596,499 A | | 1/1997 | Glusman et al. |
| 6,305,647 B1 * | | 10/2001 | Defendini ................ B64G 1/28 244/165 |
| 6,592,071 B2 | | 7/2003 | Kinkead et al. |
| 7,795,566 B2 * | | 9/2010 | Koenig ................. F41G 7/2213 244/158.1 |
| 7,930,074 B2 | | 4/2011 | Cherepinsky et al. |
| 8,688,295 B2 | | 4/2014 | Ellis et al. |
| 8,855,837 B2 | | 10/2014 | Cherepinksy |
| 2004/0098178 A1 * | | 5/2004 | Brady .................... B64G 1/288 701/4 |
| 2005/0071055 A1 * | | 3/2005 | Needelman ............ B64G 1/361 701/13 |
| 2006/0253230 A1 | | 11/2006 | Fanciullo et al. |

(Continued)

OTHER PUBLICATIONS

European Search Report; Application No. 17156904.7-1802; International Filing: Oct. 23, 2017, dated Nov. 10, 2017; 11 pages.

(Continued)

*Primary Examiner* — Gertrude Arthur Jeanglaude
(74) *Attorney, Agent, or Firm* — Cantor Colburn LLP (57) ABSTRACT

Two methods of combining multiple response types into a single flexible command model are provided and include receiving a pilot stick input, generating an aircraft response to the pilot stick input that is a continuous blend of response types by including calculable time-varying coefficients set as a function of a magnitude of the pilot stick input and other aircraft states such as airspeed, imposing at least an angular acceleration command limit and using other non-linear elements to optimize the aircraft response to the pilot stick input.

15 Claims, 5 Drawing Sheets

(56) References Cited

U.S. PATENT DOCUMENTS

2012/0253561 A1  10/2012  Ellis et al.
2015/0314855 A1  11/2015  Luszcz et al.
2015/0367937 A1  12/2015  Greenfield et al.

OTHER PUBLICATIONS

R. H. Hoh, et al.,"Evaluation of Limited Authority Attitude Command Architectures for Rotorcraft", American Helicopter Society International, Inc. May 6-8, 2003, p. 1-20.
European Office Action dated Jun. 28, 2018 cited in Application No. 17 158 904.7, 17 pgs.

* cited by examiner

FLEXIBLE COMMAND MODEL FOR AIRCRAFT CONTROL

CROSS-REFERENCE TO RELATED APPLICATIONS

This application claims benefit of priority of U.S. Provisional Application No. 62/334,206 filed on May 10, 2016, the disclosure of which is incorporated by reference.

STATEMENT OF GOVERNMENT RIGHTS

This invention was made with government support under Contract No.: W911W6-13-2-003 awarded by the United States Army. The government has certain rights in the invention.

BACKGROUND OF THE DISCLOSURE

The subject matter disclosed herein relates to a flexible command model that provides for aircraft control and, more particularly, to a flexible command model for amplitude-based mode blending that provides for aircraft control.

In aircraft and, more particularly, in rotorcraft and helicopter control systems, fly-by-wire (FBW) model-following control laws allow for the specification of a command model that determines the relationship between a pilot's stick input and the aircraft response, which is typically defined in terms of an angular rate or a linear velocity. As such, the selection of the command model can have a dramatic effect on the handling qualities of the aircraft. Indeed, the choice and the parameterizations of the command model response type involve tradeoffs of aircraft maneuverability versus aircraft stability.

Command model response types generally include rate command, attitude command and translational rate command models. In rate command attitude hold (RCAH) response type models, the pilot's stick deflection is proportional to a quasi-static angular rate response of the aircraft and when no rate is commanded the aircraft attitude is held steady. In attitude command velocity hold (ACVH) response type models, the pilot's stick deflection is proportional to a quasi-static angular attitude response of the aircraft and when no attitude is commanded the velocity is held steady. RCAH command modes can thus be viewed as a more maneuverable response type while ACVH command modes can thus be viewed as a more stable response types. Of course, other response types, such as translational rate command response types, may also be employed.

Existing FBW aircraft can, in some cases, utilize multiple pilot selectable response types but such cases involve software complexity, test cost increases and potential pilot confusion. Alternatively, FBW aircraft can utilize a single response type and compromise on either stability or maneuverability. In particular cases, a notion of frequency splitting of the pilot stick command was explored in order to combine the characteristics of multiple response types in a single mode that would then achieve some measure of maneuverability and stability.

BRIEF DESCRIPTION OF THE DISCLOSURE

This invention provides a method to combine the desirable characteristics of multiple command model modes into a single mode. Some control modes, such as rate command attitude hold (RCAH) are inherently more maneuverable. Other control modes, such as attitude command attitude hold (ACAH) are inherently more stable but less agile. Increased stability in the control mode can be particularly important for rotorcraft, such as the coaxial rigid rotor aircraft, where the relationship between attitude and speed is very shallow; meaning that a small change is attitude corresponds to a large change in trim velocity. By combining the characteristics of both modes into a single mode, predicated upon the level of stick amplitude, the pilot is able to take advantage of increased stability for small stick inputs, while maintaining agility for large stick inputs where this is desired. This approach has a cost advantage over allowing multiple pilot selectable control modes, as well as minimizing pilot training required compared to a multi-mode solution.

Two methods are described which allow for the continuous blending between response types based upon the magnitude of the pilot input and the aircraft airspeed, while retaining the ability to explicitly impose an angular acceleration limit. One method uses a single command model architecture which accounts for dynamic (time varying) response type blending between rate and attitude command. The advantage of this method is its simplicity. A second method uses multiple command models running in parallel. The advantage of this method is it is scalable to blending between more than 2 different response types—not necessarily limited to rate and attitude command. Each method also employs a non-linearity applied to control the speed of transition between response types. The functional dependence on airspeed allows for a tailoring of the command model at different portions of the flight envelope. The non-linear dependence on stick inputs allows for asymmetry relative to the transitions from the stable to the maneuverable modes. The term "flexible command model" is used to describe any implementation of the above items.

According to one aspect of the disclosure, a method of implementing a flexible command model is provided. The includes receiving a pilot stick input, generating an aircraft response to the pilot stick input that is a continuous blend of first and second response types and comprises calculable time-varying coefficients set as a function of a magnitude of the pilot stick input and an aircraft state, subjecting changes in the time-varying coefficients to a first non-linearity allowing for anti-symmetric control of the transition between the response types, realizing a differential equation of the time-varying coefficients through a selection of integrator states, subjecting the selected states of the differential equation to at least one additional non-linearity and outputting an output of the differential equation of the time-varying coefficients as a desired aircraft response.

In accordance with additional or alternative embodiments, transitions to more agile response types are more rapid than transitions to more stable response types.

In accordance with additional or alternative embodiments, a setting of the time-varying coefficients includes setting the time-varying coefficients so that for low stick amplitudes and low speeds, attitude command parameters are set, setting the time-varying coefficients so that for high stick amplitudes at low speeds, rate command parameters are set and setting the time-varying coefficients so that for high speeds, rate command parameters are set regardless of stick amplitude.

In accordance with additional or alternative embodiments, the first and second response types include angular rate command and attitude command response types, respectively.

In accordance with additional or alternative embodiments, the states are selected such that the differential equation is realized with arbitrary time-varying coefficients.

In accordance with additional or alternative embodiments, the at least one additional non-linearity includes at least one of an acceleration limit and an angular rate limit.

According to another aspect of the disclosure, a method of implementing a flexible command model is provided and includes receiving a pilot stick input, splitting the pilot stick input into different bands based on a threshold, inputting the pilot stick input in each band into a respective command model, imposing at least one non-linearity to the respective command model in each band, summing outputs of each command model with the imposed at least one non-linearity to generate a total desired command model and generating an aircraft response command to the pilot stick input in accordance with the total desired command model.

In accordance with additional or alternative embodiments, the different bands include a low stick magnitude band and a high stick magnitude band.

In accordance with additional or alternative embodiments, the respective command model for the low stick magnitude band includes an attitude command response type.

In accordance with additional or alternative embodiments, the respective command model for the high stick magnitude band includes a rate command response type.

In accordance with additional or alternative embodiments, the threshold is defined as a function of airspeed and pilot stick input amplitude.

In accordance with additional or alternative embodiments, the method further includes modifying the threshold to allow for anti-symmetric control of transitions between response types.

In accordance with additional or alternative embodiments, the at least one non-linearity enforces a total acceleration limit by subtracting a commanded acceleration from one command model from an allowed acceleration of a second command model.

In accordance with additional or alternative embodiments, the at least one non-linearity enforces a total rate limit by subtracting a commanded rate from one command model from an allowed rate of a second command model.

In accordance with additional or alternative embodiments, transitions to more agile response types are more rapid than transitions to more stable response types.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, multiple command model response types are continuously blended together based upon stick amplitude and airspeed. Implementation of only an RCAH command model response type may involve some compromises to aircraft stability, particularly for aircraft which have a high sensitivity of speed to attitude such as coaxial rigid rotor helicopters; and implementation of ACVH command model response type may involve some compromises to aircraft agility: implementations of both modes provide for both stability and agility characteristics.

In particular, two methods are provided which allow for the continuous blending between response types based upon the magnitude of a pilot stick input and aircraft airspeed while retaining the ability to explicitly impose an angular acceleration limit. One method uses a single integrated command model architecture that accounts for the dynamic (time-varying) response type blending between rate and attitude command response types. The advantage of this method lies in its simplicity. The second method uses multiple command models running in parallel. The advantage of this method is that it is scalable to blending between more than two different response types and is not necessarily limited to rate and attitude command response types. Each of the methods also employs an asymmetric non-linearity applied to control the speed of transitions between response types.

As used herein, the phrase "flexible command model" is used to describe any implementation of the items noted above or of similar items.

Also, handling qualities improvements of the flexible command model as compared to a single response type have been demonstrated with the following settings: an attitude command response type is generated for small magnitude pilot inputs at low speeds, while a rate command response type is generated elsewhere; and non-linearities which control the transitions between response types are based upon the rate of change of the pilot stick input magnitude and are set such that the transition to a rate command response type occurs at a faster rate as compared to the transition to an attitude command response type.

Figure 1:
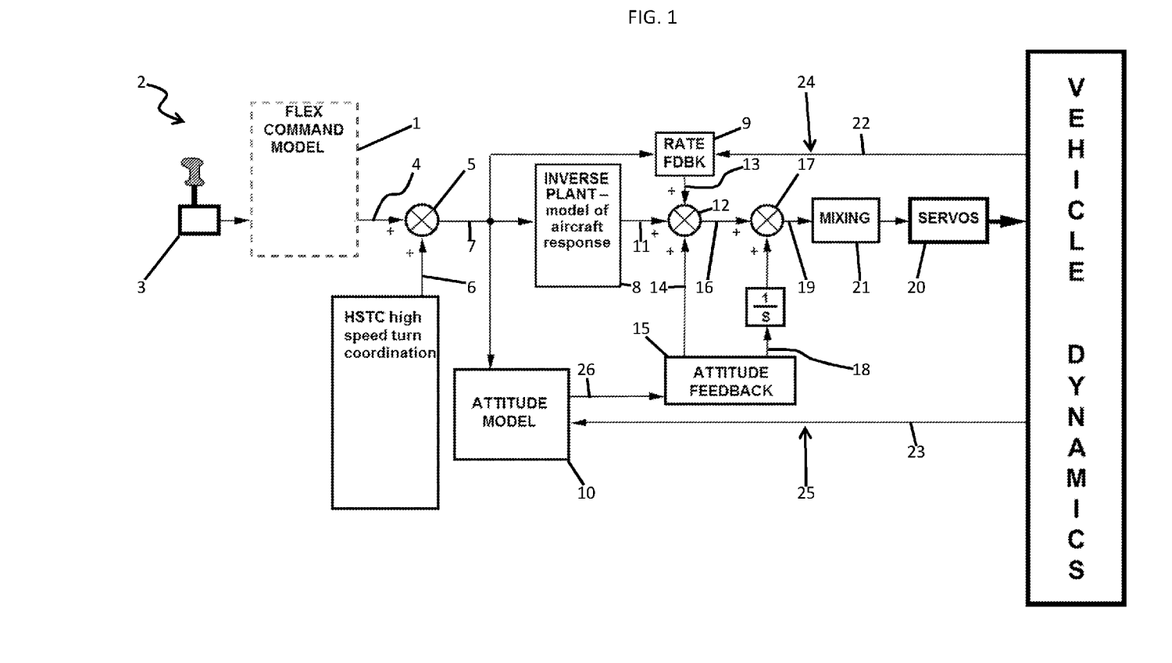
FIG. 1 is a schematic diagram illustrating a placement of a flexible command model within a model-following control laws system.

With reference to FIG. 1, placement of a flexible command model algorithm (FCM) 1 within a FBW flight control system 2 of an exemplary vehicle or aircraft is illustrated. As shown in FIG. 1, stick inputs 3 are generated by the pilot and input into the FCM 1. In the FCM 1, the stick inputs 3 are translated into initial stick input commands 4 and output to first summation unit 5. At the first summation unit 5, the initial stick input commands 4 are summed with high speed turn control (HSTC) commands 6 to generate base commands 7. The base commands 7 are then output to an inverse plant unit 8, a rate feedback unit 9 and an attitude model 10. Within the inverse plant unit 8, the base commands 7 are modified and output as secondary base commands 11 to second summation unit 12. At the second summation unit 12, the secondary base commands 11 are summed with output 13 from the rate feedback unit 9 and a first output 14 from an attitude feedback unit 15 that is interposed between the second summation unit 12 and the attitude model 10 to generate tertiary base commands 16. The tertiary base commands 16 are output from the second summation unit 12 to the third summation unit 17. At the third summation unit 17, the tertiary base commands 16 are summed with an inverse of a second output 18 from the attitude feedback unit 15 to generate quaternary base commands 19. The quaternary base commands 19 are output from the third summation unit 17 to servo control elements 20 via mixing unit 21 whereupon the servo control elements 20 actuate aircraft flight control elements to effect changes in vehicle or aircraft dynamics. Rate data 22 and attitude data 23, which are representative of rate and attitude dynamics, are then generated by various sensor systems from the vehicle or aircraft dynamics and input into the rate feedback unit 9 and the attitude model 10, respectively, as part of parallel feedback control loops 24 and 25. The rate data 22 is used by the rate feedback unit 9 in conjunction with the base commands 7 to generate the output 13 from the rate feedback unit 9 while the attitude data 23 is used by the attitude model 10 in conjunction with the base commands 7 to generate output 26 that is output from the attitude model 10 to the attitude feedback unit 15. The attitude feedback unit 15 uses the output 26 to generate the first output 14 and the second output 18.

The FCM 1 provides for a method of combining and thus taking advantage of the desirable characteristics of multiple command model modes into a single mode. As noted above, some command modes (e.g., RCAH) are inherently more agile and maneuverable and other command modes (e.g., ACAH) are inherently more stable but less agile. Therefore, by combining the characteristics of both types of command modes into a single mode, predicated upon a level of stick amplitude, a pilot is able to take advantage of increased stability for small stick inputs while maintaining agility for large stick inputs where this is desired. This combinatorial approach has a cost advantage over allowing multiple pilot selectable control modes and reduces pilot training requirements as compared to multi-mode solutions.

Two different implementations of the FCM 1 that each achieves multiple mode characteristics in a single mode will be described herein. In the first implementation, termed "Time Varying Coefficient," a single command model is created but the coefficients of the command model are allowed to vary with time. The mathematics and implementation of the single command model, which represents a differential equation, is considered so that the differential equation is successfully implemented for time-varying coefficients. A benefit of this implementation is in its relative simplicity of implementation as well as a unified treatment of non-linear terms, such as acceleration limits, in the command model. In the second implementation, termed "Multiple Command Models," two or more command models are created and their respective outputs are combined together. The unifying thread in the two implementations is a blend in response characteristics between multiple control modes based upon pilot stick amplitudes.

Implementation #1—Time-Varying Coefficients

The time varying coefficients command model includes two major components, the first being the calculation of the time-varying differential equation coefficients and the second being the time-varying command model.

Consider the second-order time-varying differential equation:

$$\ddot{q} + 2\zeta(t)w_d(t)\dot{q} + w_d(t)^2 q = \dot{u} + w_t(t)u$$

The differential equation has three coefficients or parameters, the damping ratio $\zeta$, the natural frequency $\omega_d$ and the trim break frequency $\omega_t$. An additional time-varying coefficient or parameter and a magnitude scale factor on the input can be lumped in with the input definition as in $u = K(t)\delta$, where the delta represents the pilot stick input. The output state q represents the aircraft pitch rate, but is equally applicable to other aircraft angular rates. The differential equation is sufficiently high order to implement both an attitude command type of response to the pilot input and a rate command type of response.

Figure 2:
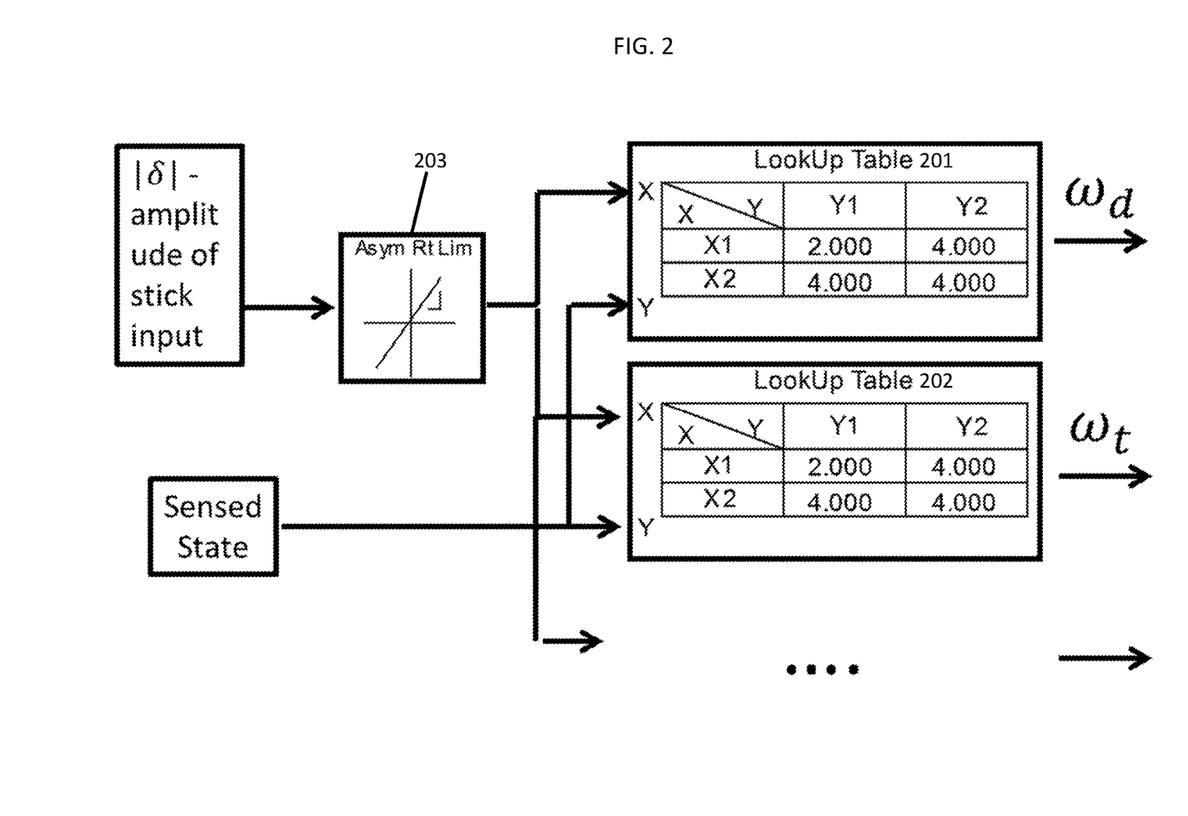
FIG. 2 illustrates a calculation of time-varying coefficients for the implementation of a single integrated flexible command model.

With reference to FIG. 2, a first component of the first implementation of the FCM 1 calculates the values of the time-varying coefficients. The algorithm is functionally related to the magnitude of the absolute value of the stick input as well as on other state variables such as airspeed as shown in the look up tables 201 and 202. The algorithm coefficients are set so that, for low stick amplitudes and low speeds, the attitude command parameters are chosen, for high stick amplitudes at low speeds, the rate command parameters are chosen and for high speeds, rate command parameters are set regardless of stick amplitude. The functional dependence on sensed state, such as airspeed, allows for the command model blending to fade to a single command mode at high speeds where the desired blending characteristics may be different than they are at low speeds.

The magnitude of the stick input may be subject to an asymmetric rate limit 203 that can be configured to allow the coefficients to change to the more maneuverable mode coefficients more rapidly than to change back to the more stable mode coefficients. This may be desirable in order to not interrupt the high agility mode of the aircraft for transitory small stick amplitudes or rapid reversals in control deflection. In general, it may be desirable to provide shaping on the pilot stick inputs prior to utilizing the pilot stick inputs to switch modes. The asymmetric limit is one example of such shaping options.

Figure 3:
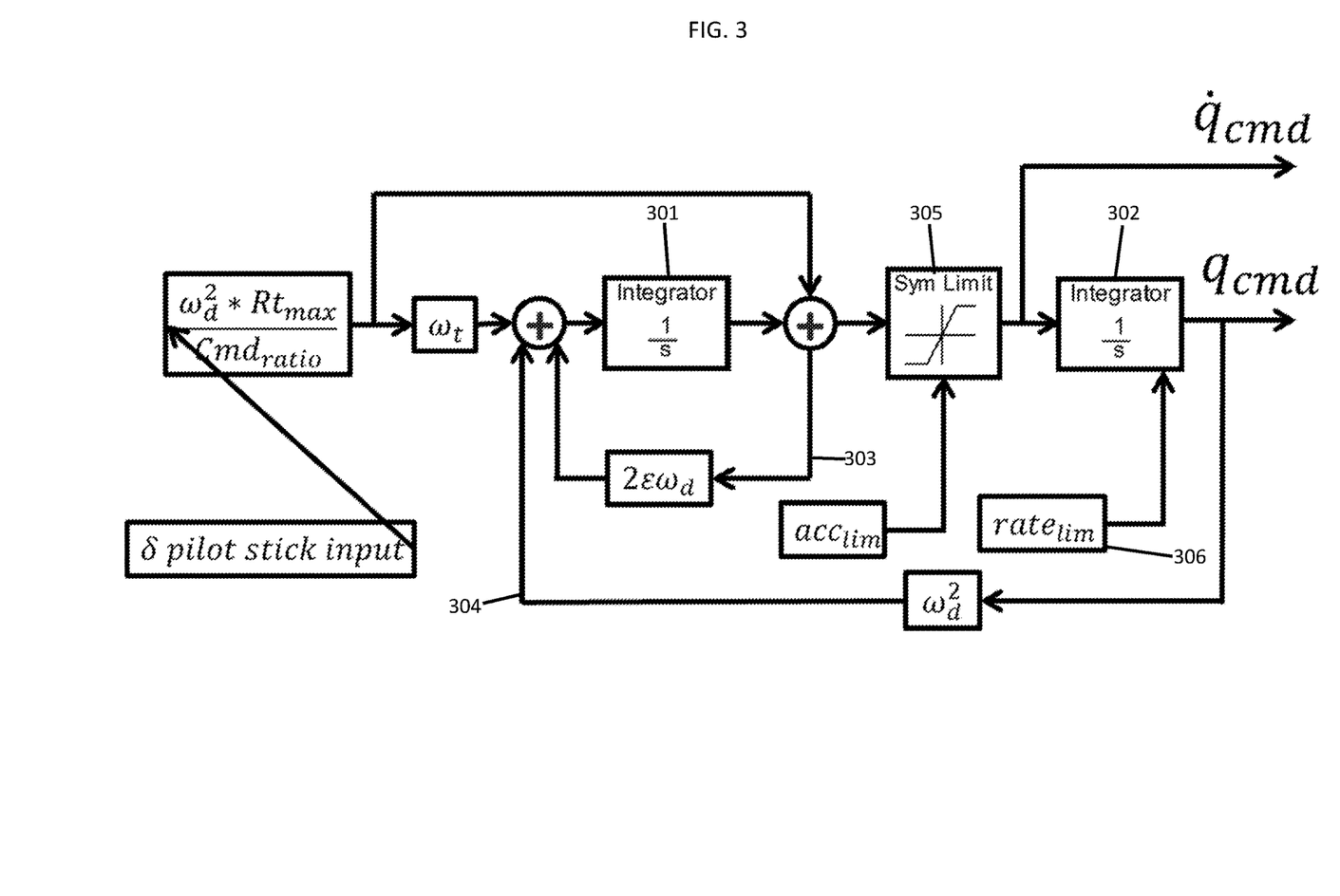
FIG. 3 illustrates a method of implementing a single integrated flexible command model based upon the coefficients of FIG. 2.

With reference to FIG. 3, the second implementation component of the first flex command model implementation is based on a realization of a time-varying coefficient differential equation. The states utilized in the realization of the differential equation (e.g. the integrators) are chosen to ensure that the equation is properly represented in the face of time-varying coefficients as well as any desired non-linear terms in response, such as acceleration limits.

For example, the choice of states as a lagged value of the input:

$$x_1 = \frac{1}{(s+w_d)^2} u,$$

and its derivative:

$$x_2 = \frac{s}{(s+w_d)^2} u,$$

can be an effective choice of states if the coefficients are not time-varying. It can also be noted that for linear time-varying coefficient differential equations with no derivative terms on the input u, the states can always be chosen as each of the derivative terms. This includes equations of the form:

$$\dddot{q} + a_1(t)\ddot{q} + a_2(t)\dot{q} + a_3(t)q = K(t)u.$$

The highest order derivative, in this case $\dddot{q}$, can be calculated by multiplying each of the other derivative states by its time varying coefficient as well as the input by its time varying coefficient. The states are then calculated by simply integrating the next higher order derivative, which is the previous state for all cases except $\ddot{q}$.

The differential equation required for this implementation has both time varying coefficients and derivative terms on the input signal u. Recalling that the differential equation to be implemented is:

$$\ddot{q}+2\zeta(t)w_d(t)\dot{q}+w_d(t)^2 q=\dot{u}+w_t(t)u,$$

since the first state may be chosen as $x_1=q$ and the second state may be chosen as $x_2=\dot{q}-u$, the first state can be produced by first summing the second state with the input u and then integrating. The second state $x_2=\dot{q}-u$ can be implemented by integrating its derivative which is $\dot{x}_2=\ddot{q}-\dot{u}$. According to the desired differential equation, this term is $$\ddot{q}-\dot{u}=w_t(t)u-2\zeta(t)w_d(t)\dot{q}+w_d(t)^2 q,$$

which can be further re-written as a function of the states $x_1$, $x_2$ and time varying coefficients. This is consistent with the implementation depicted in FIG. 3, where the integrator boxes 301, 302 contain the two states mentioned above. The two feedback paths 303, 304 shown in FIG. 3 are the terms in the above equation used to calculate $\ddot{q}-\dot{u}$ or the derivative of the second state.

In addition, several non-linear terms are also implemented in the depiction of FIG. 3. This includes an acceleration limit represented by the symmetric limit box 305 and an angular rate limit 306 implemented as a limit on the final output integrator. The acceleration limit is useful both from handling and load reduction perspectives. The rate limit can be desirable because multiple aircraft loads correlate with aircraft maneuvering rates. Indeed, on the coaxial, rigid rotor helicopter, gyroscopic rotor loads are one example of a force that scales with the aircraft rate. Load factor is another example of a force that scales with aircraft rate.

Implementation #2—Multiple Command Modes

The second implementation of the FCM 1 blends multiple modes together by splitting the pilot stick input into several different bands based on the stick amplitude and then inputting the pilot stick command in each band through its own command model. The output of each of the command models is then summed back together to create the total desired command model output. Non-linear terms in the command model, such as acceleration limits, are apportioned between each of the multiple command models so that the overall limit is satisfied.

Four components of the second implementation may include a stick partitioning algorithm 401, linear command models, a partitioning of non-linear terms and a final summing of command model outputs.

Figure 4:
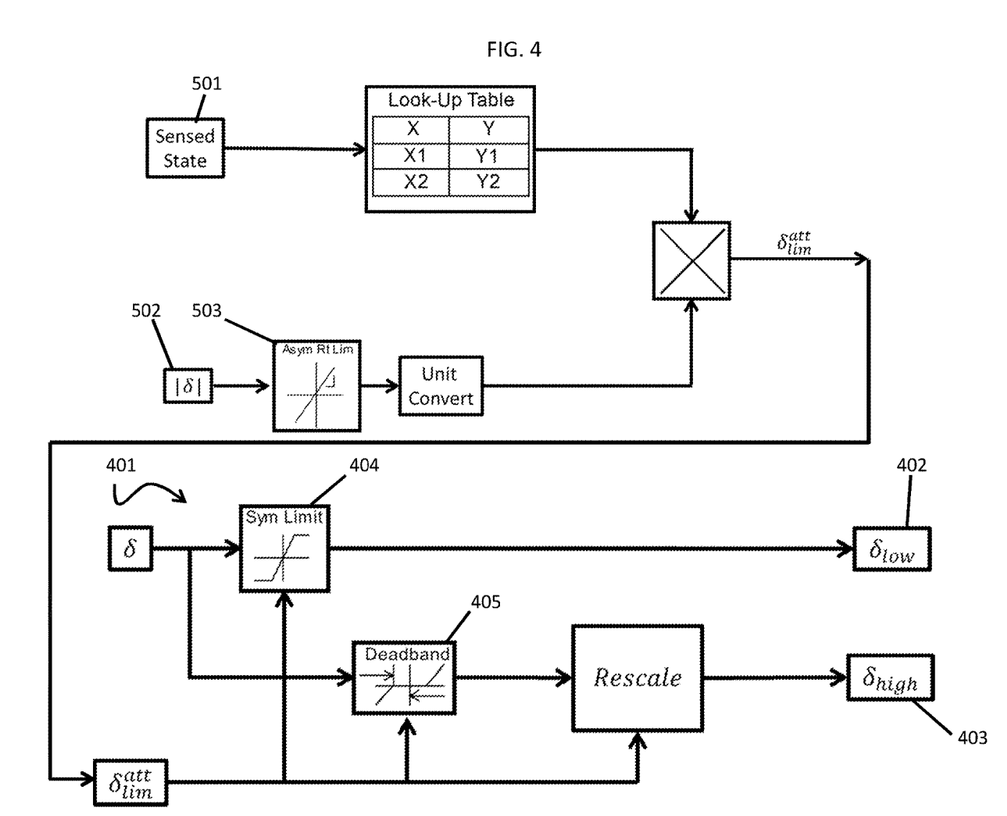
FIG. 4 is a schematic diagram illustrating a splitting of pilot stick inputs into multiple pilot stick input bands for combining multiple command models into a single flexible command model and an implementation of band scheduling based upon aircraft state and the asymmetric response type transition.

With reference to FIG. 4, the stick partitioning algorithm 401 will now be described. The output of the stick partitioning algorithm 401 is the resulting division of pilot stick inputs into two pilot stick bands including a low amplitude stick band 402 for the attitude command model and a high amplitude stick band 403 for the rate command model. As shown in FIG. 4, the pilot stick inputs are subject to a symmetric limit 404, with the limit being the maximum size of the first stick band. The output of the symmetric limit 404 is the low amplitude stick input for attitude command. The pilot stick inputs are also subject to a deadband 405, which eliminates the stick content already allocated to the low amplitude stick command model, to determine how much to appropriately rescale and allocate to the high amplitude stick command model.

A calculation of pilot stick input limits that is used to divide the pilot stick inputs into multiple stick bands in the multiple command model implementation is illustrated. The calculation algorithm may be used both to vary the characteristics of the FCM 1 as a function of sensed state, such as speed, but also to provide for asymmetry relative to the transitions from stable to maneuverable modes as compared to reverse transitions. As shown in FIG. 4, the pilot stick input band limit is calculated as a function of aircraft sensed state 501, such as airspeed, and as a function of stick amplitude 502 subject to an asymmetric rate limit 503, which allows for a transition to the more maneuver mode more rapidly than the return to the more stable mode.

Figure 5:
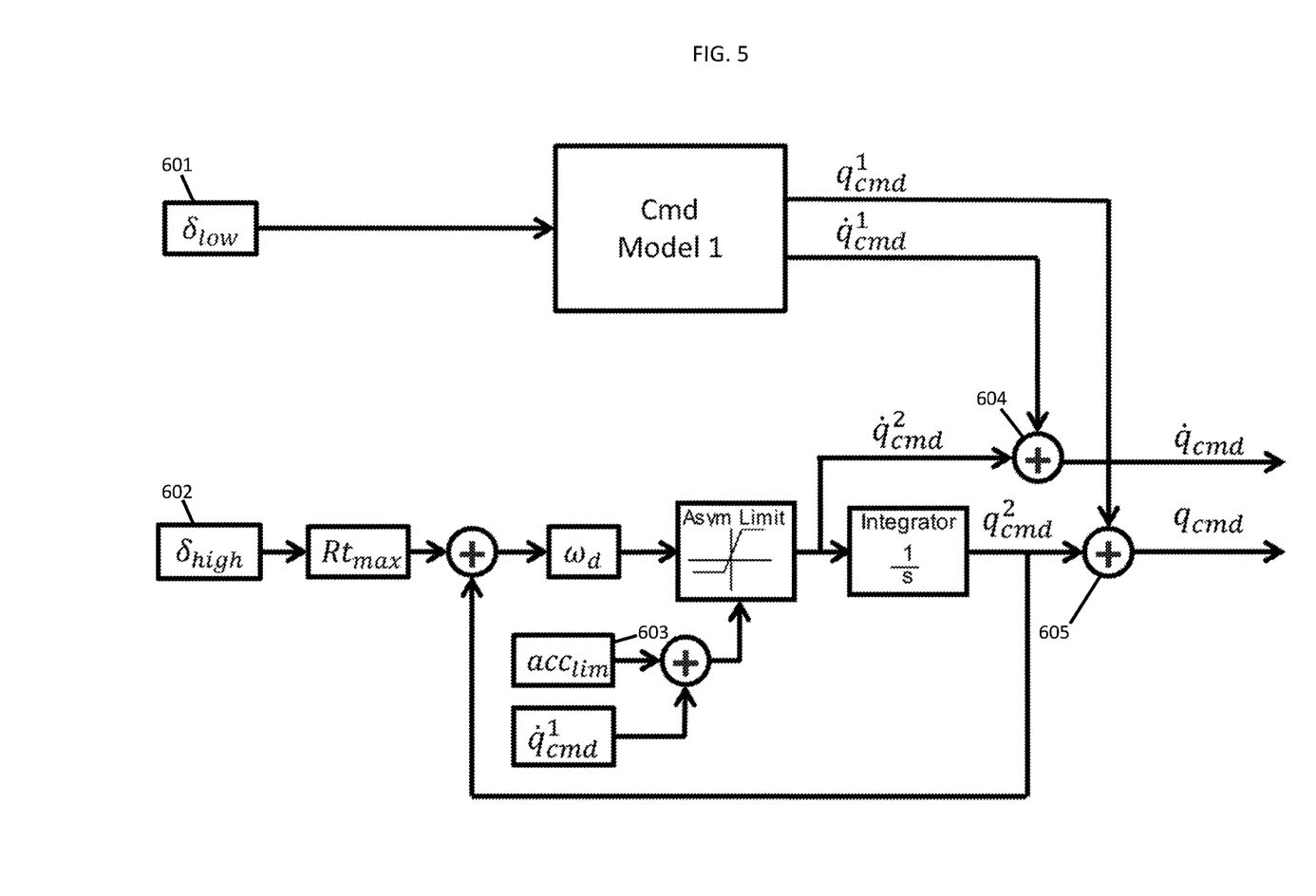
FIG. 5 is a schematic diagram illustrating an implementation of multiple command models into a single a flex command model in accordance with embodiments.

With reference to FIG. 5, an implementation of multiple command models is illustrated along with the partitioning of command model non-linear terms and a final summing of the command model outputs. The low amplitude pilot stick input 601 is input into the FCM 1, which can implement, for example, a first-order or second order attitude command model. The high amplitude stick input 602 is input into a separate command model, which, in this case, implements a first order rate command model. The command models are similar to the command models discussed in the first implementation except that they are not subject to time-varying coefficients.

Each command model is subject to non-linear terms including an acceleration limit 603. The non-linear terms between the multiple command models are coordinated to allow an overall acceleration limit to be met. As shown FIG. 6, the rate command model is subject to an acceleration non-linearity, which is also corrected to account for the acceleration that is currently being commanded in FCM 1. The correction is shown below 603 with the summation of the q1_dot signal, which is the acceleration currently being commanded from the attitude command model. In other words, in order to limit to total commanded acceleration, the acceleration commanded in the first command model is used to limit the remaining capability of the second command model to command acceleration. The final output is the commanded rate and acceleration, which is produced by summing the multiple command models together at summation units 604, 605 to obtain a total FCM 1 output.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of implementing a flexible command model, the method comprising:
   receiving a pilot stick input;
   generating an aircraft response to the pilot stick input that is a continuous blend of first and second response types and comprises time-varying coefficients set as a function of a magnitude of the pilot stick input and an aircraft state;
   subjecting changes in the time-varying coefficients to a first non-linearity allowing for anti-symmetric control of transitions between the first and second response types;

calculating a differential equation of the time-varying coefficients based on selected integrator states;

applying the selected states of the differential equation to at least one additional non-linearity;

outputting an output of the differential equation of the time-varying coefficients as a desired aircraft response; and controlling an aircraft based on the desired aircraft response.

2. The method according to claim 1, wherein transitions to more agile response types are more rapid than transition to more stable response types.

3. The method according to claim 1, wherein a setting of the time-varying coefficients comprises:

setting the time-varying coefficients so that for low stick amplitudes and low speeds, attitude command parameters are set;

setting the time-varying coefficients so that for high stick amplitudes at low speeds, rate command parameters are set; and setting the time-varying coefficients so that for high speeds, rate command parameters are set regardless of stick amplitude.

4. The method according to claim 1, wherein the first and second response types comprise angular rate command and attitude command response types, respectively.

5. The method according to claim 1, wherein the states are selected such that the differential equation is realized with arbitrary time-varying coefficients.

6. The method according to claim 5, wherein the at least one additional non-linearity comprises at least one of an acceleration limit and an angular rate limit.

7. A method of implementing a flexible command model, the method comprising:

receiving a pilot stick input;

splitting the pilot stick input into different bands based on a threshold;

inputting the pilot stick input in each band into a respective command model;

applying at least one non-linearity to the respective command model in each band;

summing outputs of each command model with the imposed at least one non-linearity to generate a total desired command model;

generating an aircraft response command to the pilot stick input in accordance with the total desired command model; and controlling an aircraft based on the aircraft response command.

8. The method according to claim 7, wherein the different bands comprise a low stick magnitude band and a high stick magnitude band.

9. The method according to claim 8, wherein the respective command model for the low stick magnitude band comprises an attitude command response type.

10. The method according to claim 8, wherein the respective command model for the high stick magnitude band comprises a rate command response type.

11. The method according to claim 7, wherein the threshold is defined as a function of airspeed and pilot stick input amplitude.

12. The method according to claim 7, further comprising modifying the threshold to allow for anti-symmetric control of transitions between response types.

13. The method according to claim 7, wherein the at least one non-linearity enforces a total acceleration limit by subtracting a commanded acceleration from one command model from an allowed acceleration of a second command model.

14. The method according to claim 7, wherein the at least one non-linearity enforces a total rate limit by subtracting a commanded rate from one command model from an allowed rate of a second command model.

15. The method according to claim 7, wherein transitions to more agile response types are more rapid than transitions to more stable response types.

* * * * *